(No Model.) 2 Sheets—Sheet 2.
J. F. MALLINCKRODT.
CAR BRAKE.
No. 329,462. Patented Nov. 3, 1885.
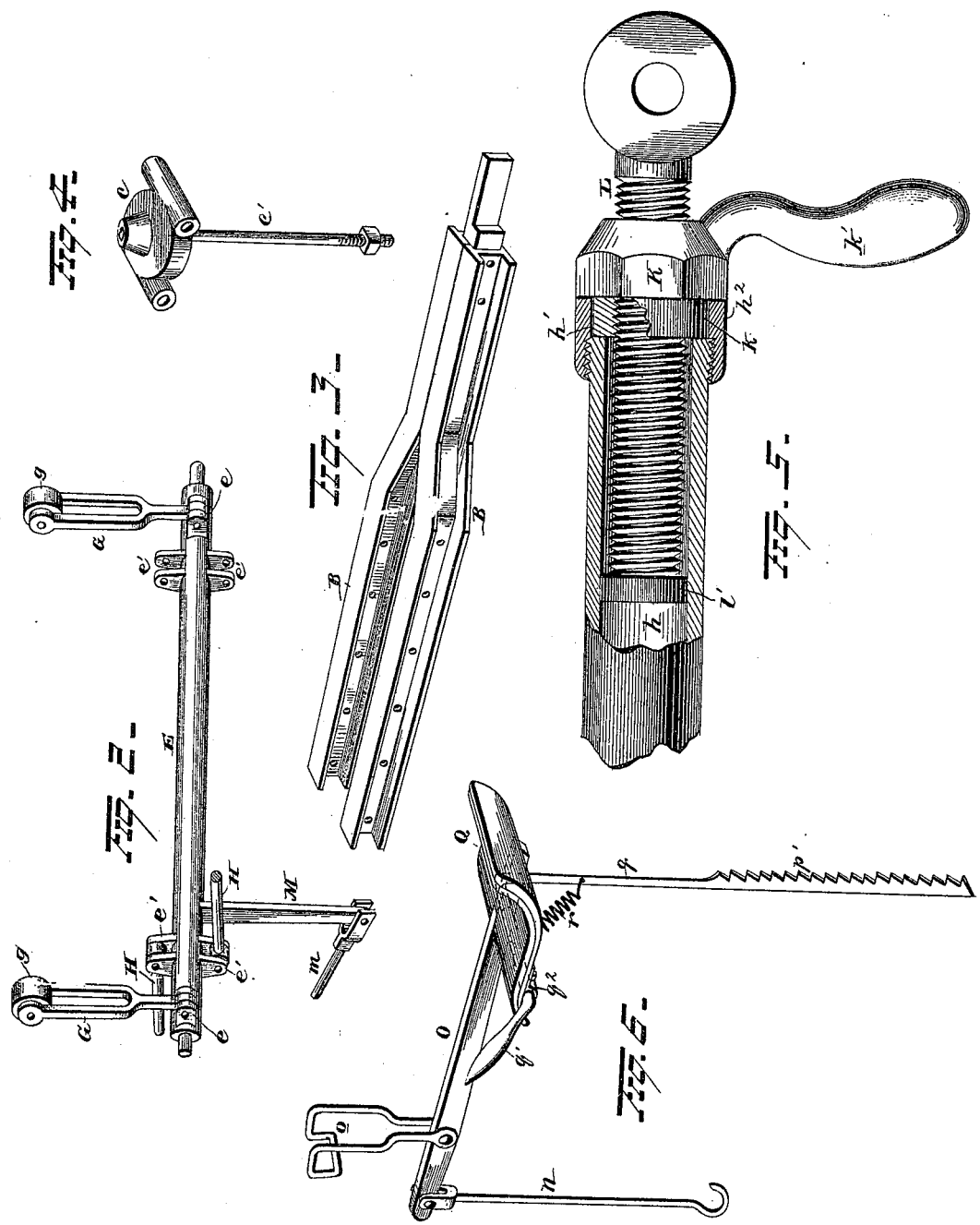
WITNESSES
INVENTOR

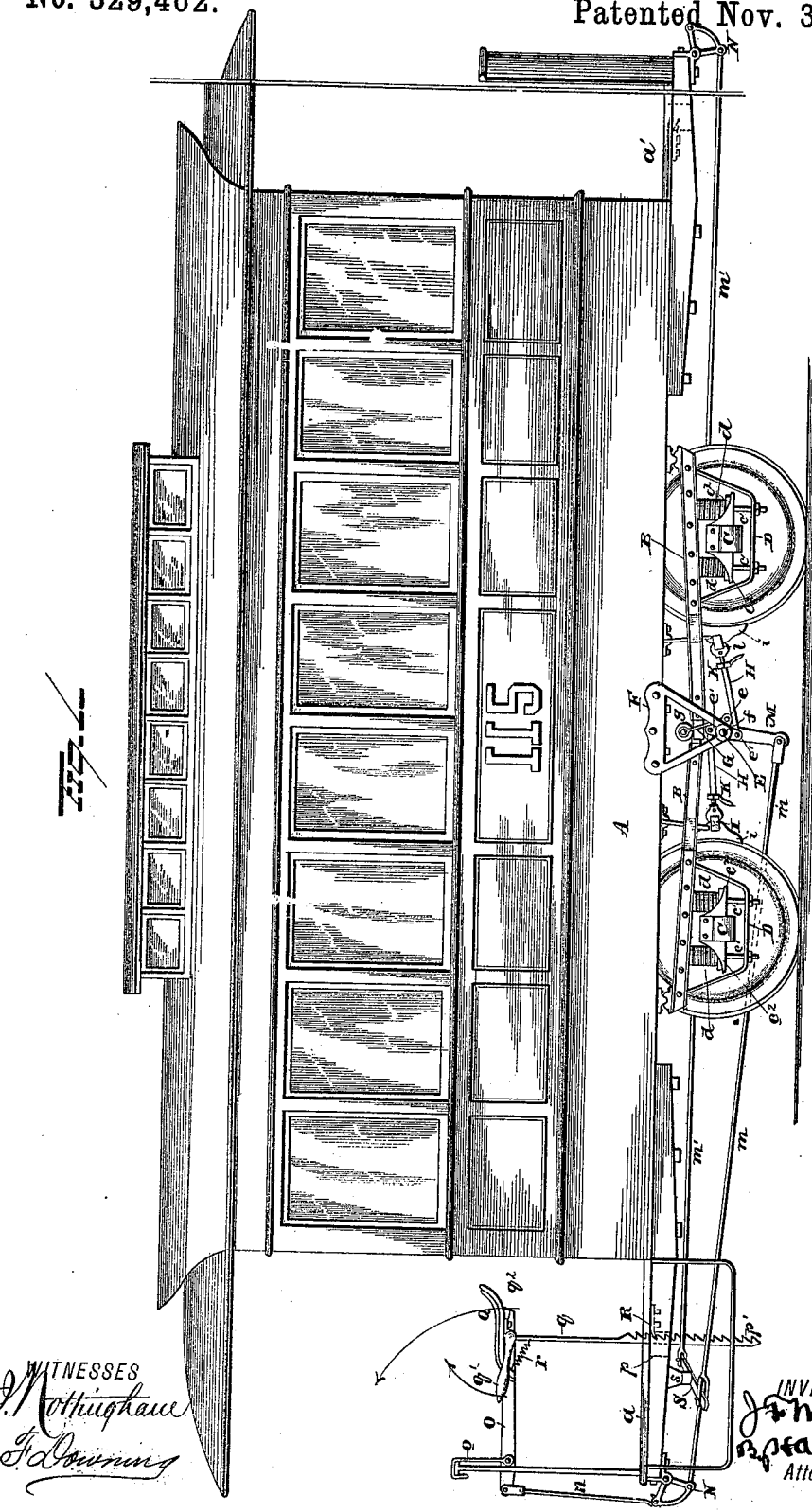

UNITED STATES PATENT OFFICE.

JOHN F. MALLINCKRODT, OF ALLEGHENY CITY, PENNSYLVANIA.

CAR-BRAKE.

SPECIFICATION forming part of Letters Patent No. 329,462, dated November 3, 1885.

Application filed March 13, 1885. Serial No. 158,709. (No model.)

*To all whom it may concern:*

Be it known that I, JOHN F. MALLINCKRODT, of Allegheny City, in the county of Allegheny and State of Pennsylvania, have invented certain new and useful Improvements in Car-Brakes; and I do hereby declare the following to be a full, clear, and exact description of the invention, such as will enable others skilled in the art to which it appertains to make and use the same.

My invention relates to an improvement in car-brakes, and more particularly to brakes for use on horse-cars.

In an application for Letters Patent filed December 20, 1884, Serial No. 150,826, and allowed January 21, 1885, for an improvement in car-brakes, I explained and claimed a system of brake mechanism by means of which the weight of the driver would serve to set the brakes in the ordinary system and to release the brakes in the gravity system.

The object of my present invention is to provide a system of brakes and brake mechanism by which the weight of the driver may be more advantageously employed in holding the brakes off than has hitherto been accomplished, and to further provide means for locking the brakes off when for any cause the driver desires to leave his seat, a further object being to provide a novel construction of levers and connecting devices for supporting the weight of the car, transmitting the weight of the car to the brakes and the weight of the driver to the car; and with these ends in view my invention consists in certain features of construction and combinations of parts, as will be hereinafter described, and pointed out in the claims.

In the accompanying drawings, Figure 1 is a view of a portion of a car, showing the braking mechanism in side elevation. Fig. 2 is a detached view of the crank-shaft. Fig. 3 is a detached view of one of the car-supporting levers. Fig. 4 is a detached view of one of the spring-caps and guide-bolts. Fig. 5 is a detached view of one of the push-rods, and Fig. 6 is a detached view of the removable operating-lever, driver's seat, and lock-bar.

A represents the lower portion of a car-body provided with the front and rear platforms, $a$ and $a'$, respectively. The car-body rests upon and is hinged or pivotally secured to the short arms of the supporting-levers B, which are arranged in pairs, two on each side of the car, with their long arms meeting and lapping past each other for a short distance at or near the centers of the sides of the car. The levers B consist of forked bars, between the branches of which are riveted or otherwise secured the spring-caps $c$, in which the heads of the guide-bolts $c'$ are secured. The bolts extend downwardly through the wings $c^2$ on the axle-boxes C, and are secured at their lower ends in the depending bracket D, which has its ends secured to the bar B. The levers B are thus fulcrumed on the axles, and the elevation or depression of the ends of their long arms will serve to elevate or depress the car-body. Springs $d$ are interposed between the wings $c^2$ on the axle-boxes and the caps $c$, and are preferably held in position by the guide-bolts $c'$. As the weight of the car compresses the springs $d$ the bolts $c'$ slide downwardly through the wings $c^2$. A crank-shaft, E, is journaled transversely of the car in suitable bearings, $f$, in depending brackets F. The shaft E is conveniently under the lapping ends of the levers B, and is provided with two pairs of lugs, $e$, between which the lower ends of connecting-links G are pivotally secured. The upper ends of the links G are in the form of rectangular loops, which embrace the lapping ends of the levers B and carry anti-friction rollers $g$, which bear against the upper edges of the said lapping ends. The shaft E is further provided with two pairs of vertical lugs, $e'$, at or near each end, and extending in opposite directions, for the attachment thereto of the push-rods H. The push-rods H are attached to the backs of the brake-beams I, which are suspended in the usual or any approved manner, and have the brake-shoes $i$, secured thereto. The push-rods H consist of hollow rods $h$, pivoted to the lugs $e'$ at one end, and provided with an enlarged bore, $h'$, for a short distance from the other end, in which fits a sleeve projection, $k$, formed on the nut K. The enlarged bore $h'$ may be formed by reaming out the section $h$ or by screwing a short section, $h^2$, onto the end of the section $h$. Male threaded push-rod sections L have their heads secured to the brake-beams at $l$, and extend through the nuts and female threaded sleeves $k$ into the hollow sections $h$. The ends of the screws are provided with cylindrical disks or buttons $l'$, which are somewhat larger than the screw portions, and serve to protect the thread from wear against the surface of the bore. The nuts K are provided with a handle, $k'$, by means of which they may be conveniently turned and the push-rods thereby lengthened as required. An operating-arm, M, rigidly secured to the crank-shaft, is connected at its outer end with a sector-bar, N, pivoted to the front edge of one of the platforms by a rod, $m$. A second connecting-rod, $n$, is pivotally secured to the short arm of the operating-lever O, which latter is fulcrumed in a hook-link, $o$, adapted to be removably secured to the platform-rail P. The lower end of the rod $n$ is also adapted to be removably secured to the upper end of the sector-bar N. The driver's seat Q is secured to the long arm of the lever Q, and a crank-rod, $q$, extending downwardly through a slot, $p$, in the platform, in the form of a ratchet-bar, $p'$, and provided with a handle, $q'$, on its upper end, is journaled in a bracket, $q^2$, secured to the under side of the seat Q, and in a suitable bearing in the lever O. A pawl, R, is located in the rear edge of the slot $p$, and is adapted to engage the teeth of the ratchet-bar $p'$ and lock it in a depressed adjustment. The bar $p'$ is held normally out of contact with the pawl R by a spiral spring, $r$, connecting it with the lever O, and is thrown into and out of contact with the pawl by depressing and raising the handle $q'$, respectively. The operating-lever O, together with the driver's seat Q, crank-rod $q$, connecting-rod $n$, and hook-link $o$, may be taken from their position on one platform and removed to the opposite platform by simply detaching the rod $n$ from the sector-bar N. The sector-bar N on the opposite end of the car is connected by a rod, $m'$, with one end of a lever, S, pivoted to a depending standard, $s$, secured to the bottom of the car, the other end of the lever S being pivotally secured to the connecting-rod $m$. By this connection the raising and lowering of the operating-lever O will produce the same effect upon the brakes on whichever platform it may be placed.

The brakes are operated as follows: The weight of the car on the levers B tends to raise the lapping ends of the levers, and hence to rotate the shaft E, and through the push-rods H set the brakes. The weight of the car is lifted from the brakes by a downward pressure on the long arm of the operating-lever O, transmitted to the shaft E through the rods $m$ $m'$ and $n$ and arm M, and from the shaft E to the levers B through the links G. The pressure on the long arm of the lever O is conveniently applied by placing the driver's seat on the arm, and thereby bringing into use the weight of the driver in a sitting posture for holding the brakes off. By the use of the ratchet-bar $p'$ the brakes may be locked off when for any cause the driver wishes to leave his seat without stopping the car.

It is evident that many slight changes in the form and arrangement of the several parts might be resorted to without departing from the spirit and scope of my invention; hence I do not wish to limit myself strictly to the construction herein set forth; but, Having fully described my invention, what I claim as new, and desire to secure by Letters Patent, is—

1. The combination, with a set of car-supporting levers fulcrumed on the axles, and a crank-shaft journaled transversely to the levers and connected therewith by a link or its equivalent, of two sets of projections secured to the shaft, rods connecting the said projections and brake-beams, and means for rocking the shaft, substantially as set forth.

2. The combination, with a set of car-supporting levers fulcrumed on the axles, and a crank-shaft journaled transversely to the levers and connected therewith by an operating-link, of longitudinally-adjustable push-rods connecting the brake-beams with projections on the crank-shaft, and means for rocking the crank-shaft, substantially as set forth.

3. The combination, with a set of car-supporting levers fulcrumed on the axles and having their adjacent ends lapped, of a crank-shaft journaled transversely to the levers, a link attached to a lug or arm on the shaft and embracing the lapped ends of the levers, push-rods connecting the shaft and brake-beams, and means for rocking the shaft, substantially as set forth.

4. The combination, with a set of forked car-supporting levers and winged or flanged axle-boxes, of spring-caps secured between the branches of the levers, guide-bolts having their heads secured in the spring-caps, and their opposite ends secured in a bracket attached to the lever, and springs interposed between the caps and axle-boxes, substantially as set forth.

5. The combination, with a set of brakes adapted to be operated by the weight of the driver, of a brake-operating lever detachably connected with the braking mechanism and constructed to be transferred from one end of the car to the other, substantially as set forth.

6. The combination, with a set of gravity-brakes adapted to be taken off by the weight of the driver, of a brake-operating lever detachably connected with the braking mechanism and adapted to be transferred from one end of the car to the other, substantially as set forth.

7. The combination, with a set of gravity-brakes and a brake-operating lever secured to the platform-rail, of a spring-actuated ratchet-bar secured to the lever, and a pawl secured to the platform for engaging the ratchet-bar and locking the brakes off, substantially as set forth.

8. In a system of brakes adapted to be operated by the weight of the driver, an operating-lever provided with a driver's seat, a ratchet-bar, and a connecting-rod, the lever being removably secured to the platform-rail and adapted to be transferred from one platform to another, substantially as set forth.

9. In a system of brakes, a push-rod for transmitting the rotary motion of the crank-shaft to brake-beams, consisting, essentially, of a hollow section and a screw-section, and a nut for adjusting the screw within the hollow section, substantially as set forth.

10. In a system of brakes, the combination, with a push-rod for transmitting the motion of the crank-shaft to the brake-beams, said push-rod consisting of a hollow section and a screw-section, of an adjusting-nut provided with a female-threaded sleeve adapted to enter an enlarged bore in the hollow section, thereby forming a guide for the screw-section, substantially as set forth.

11. In a system of brakes, the combination, with a two-section rod for transmitting the motion of the crank-shaft to the brake-beams, of an adjusting-nut provided with a handle and adapted to form a guide for the screw-section and a disk or button on the end of the screw-section for protecting the thread, substantially as set forth.

In testimony whereof I have signed this specification in the presence of two subscribing witnesses.

JOHN F. MALLINCKRODT.

Witnesses:
ELLA McKEAN,
DAVID NEILLIE.